United States Patent [19]

Maltby, Jr. et al.

[11] 4,454,972
[45] Jun. 19, 1984

[54] METHOD OF AND APPARATUS FOR SEVERING GLASS

[75] Inventors: Robert E. Maltby, Jr., Wayne; James T. Sikorski, Rossford, both of Ohio

[73] Assignee: Libbey-Owens-Ford Company, Toledo, Ohio

[21] Appl. No.: 368,678

[22] Filed: Apr. 15, 1982

[51] Int. Cl.³ .............................................. C03B 33/02
[52] U.S. Cl. ...................................... 225/96.5; 225/2
[58] Field of Search ........................... 225/2, 96.5, 103

[56] References Cited

U.S. PATENT DOCUMENTS

| | | | |
|---|---|---|---|
| 1,315,799 | 9/1919 | Suman | 225/96.5 |
| 3,116,862 | 1/1964 | Gorter | 225/2 |
| 3,303,980 | 2/1967 | Offenbacher | 225/96.5 X |
| 3,532,260 | 10/1970 | Augustin et al. | 225/96.5 X |
| 3,795,572 | 3/1974 | DeTorre | 225/2 X |
| 4,049,167 | 9/1977 | Guissard | 225/96.5 X |
| 4,196,830 | 4/1980 | Oravitz, Jr. et al. | 225/96.5 X |

*Primary Examiner*—Frank T. Yost
*Attorney, Agent, or Firm*—Phillip S. Oberlin

[57] ABSTRACT

An apparatus for partially fracturing a glass body along a score line to facilitate subsequent severance of the body along such score line by conventional top and bottom roller devices. The partial fracturing is effected by an apparatus having an impact element periodically engageable against the glass body on the glass surface opposite the surface on which the score line is inscribed.

5 Claims, 5 Drawing Figures

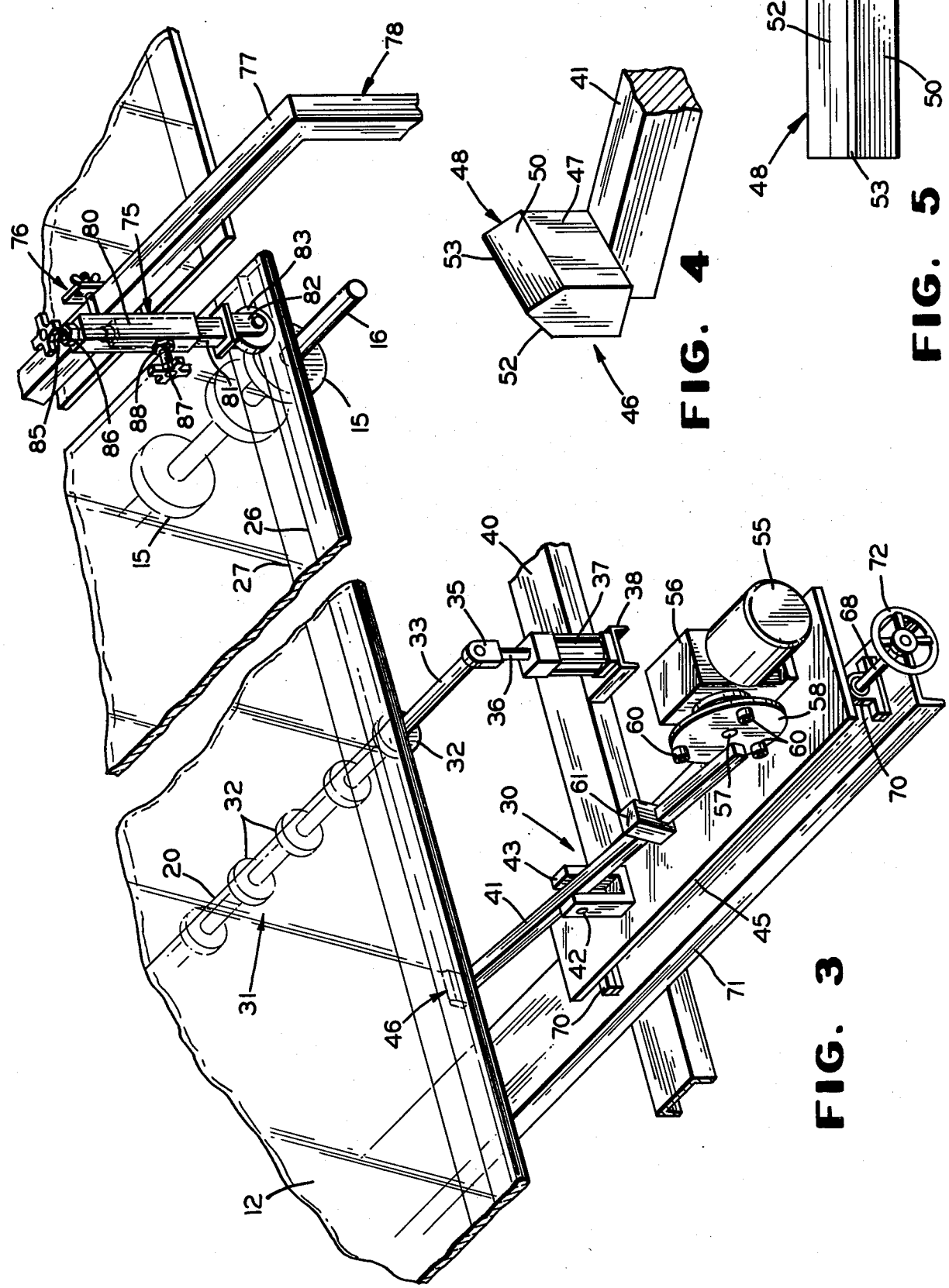

METHOD OF AND APPARATUS FOR SEVERING GLASS

BACKGROUND OF THE INVENTION

The present invention relates generally to cutting glass and, more particularly, to an apparatus and method for cutting elongated strips from flat glass in ribbon or sheet form.

A common expedient for cutting glass is to score the major surface of the glass along the intended line of cut and then apply a bending moment across the score line to snap or fracture the glass therealong. However, it is difficult to achieve a quality cut when cutting elongated strips, such as undesirable selvedge portions, from thick glass bodies. As the thickness of the glass increases, more difficulty is encountered in obtaining a true and clean break along the score lines. Very often, the cut leaves rough, jagged or otherwise irregular severed edges as well as edges that are non-perpendicular to the major surfaces of the glass. It is believed that the reason for this is that a residual, unbalanced stress pattern is set up in the glass, the stress varying across the width of the sheet or ribbon due to conditions inherent in the formation of thick glass. One of these adverse conditions may be the nonuniform cooling across the width of the glass body. As a result, an area of high residual compressive stresses is produced along the outer edges of the ribbon after it has cooled below the annealing temperature range. Accordingly, when running a cut longitudinally of the ribbon within this area in an effort to trim the selvedge edge, the selvedge distorts on being separated from the main body to cause edge damage as well as sometimes severely fragmenting the cut-off portion or selvedge.

One solution to this problem involves redistributing the stress pattern within the glass body prior to making the final cut. This is effected by removing a portion of the glass along the outer edges thereof outwardly of the final or intended line of cut prior to making such final trim cut. This preliminary cut reduces the residual compressive stresses in this region of the ribbon and significantly relieves the compressive stresses along the final intended line of cut to produce a more uniform stress pattern therealong. The resultant cut along such final or intended line of cut produces a severed edge that is clean and smooth and substantially free from defects.

Attempts to make the first trim cut by apparatus for automatically applying a bending moment along the score line is not entirely satisfactory because the high degree of compression in this region of the glass often causes the cut to deviate laterally from the first score line, the cut sometimes meandering inwardly across the final intended line of cut. Also, the inherent high compressive stresses residing in the region of the first score line can cause the glass to fragment when a cut begins to run, posing a safety hazard to the operators or attendants of the apparatus. Consequently, it has been found preferable to make the first trim cut manually by utilizing nipping tools or pliers. However, it can be appreciated that the manual labor involved in such a continuous cutting operation adds materially to production costs.

SUMMARY OF THE INVENTION

Accordingly, it is a primary object of the present invention to obviate the above-noted shortcomings by providing an apparatus for weakening the glass along the first score line prior to making the cut by conventional glass breaking apparatus.

Another object of this invention is to provide a new and useful apparatus for partially fracturing or cracking the glass along the first score line prior to the severance thereof to contain the subsequent running cut along such score line.

A further object of the present invention is to provide in the foregoing apparatus a pivotal, impact head for periodically tapping the glass body beneath the score line for creating fissures or cracks in the glass body to facilitate subsequent severance thereof without resultant glass fragmentation.

The foregoing and other objects, advantages, and characterizing features of the present invention will become clearly apparent from the ensuing detailed description thereof considered in conjunction with the accompanying drawings wherein like reference characters denote like parts throughout the various views.

BRIEF DESCRIPTION OF THE DRAWINGS

FIG. 3 is an enlarged, fragmentary, perspective view of the tapper assembly shown in FIG. 2;

FIG. 4 is an enlarged, fragmentary, perspective view, showing details of the tapping head employed in this invention; and FIG. 5 is a top plan view of the tapping head shown in FIG. 4.

DETAILED DESCRIPTION OF THE PREFERRED EMBODIMENT

Figures 1, 2:
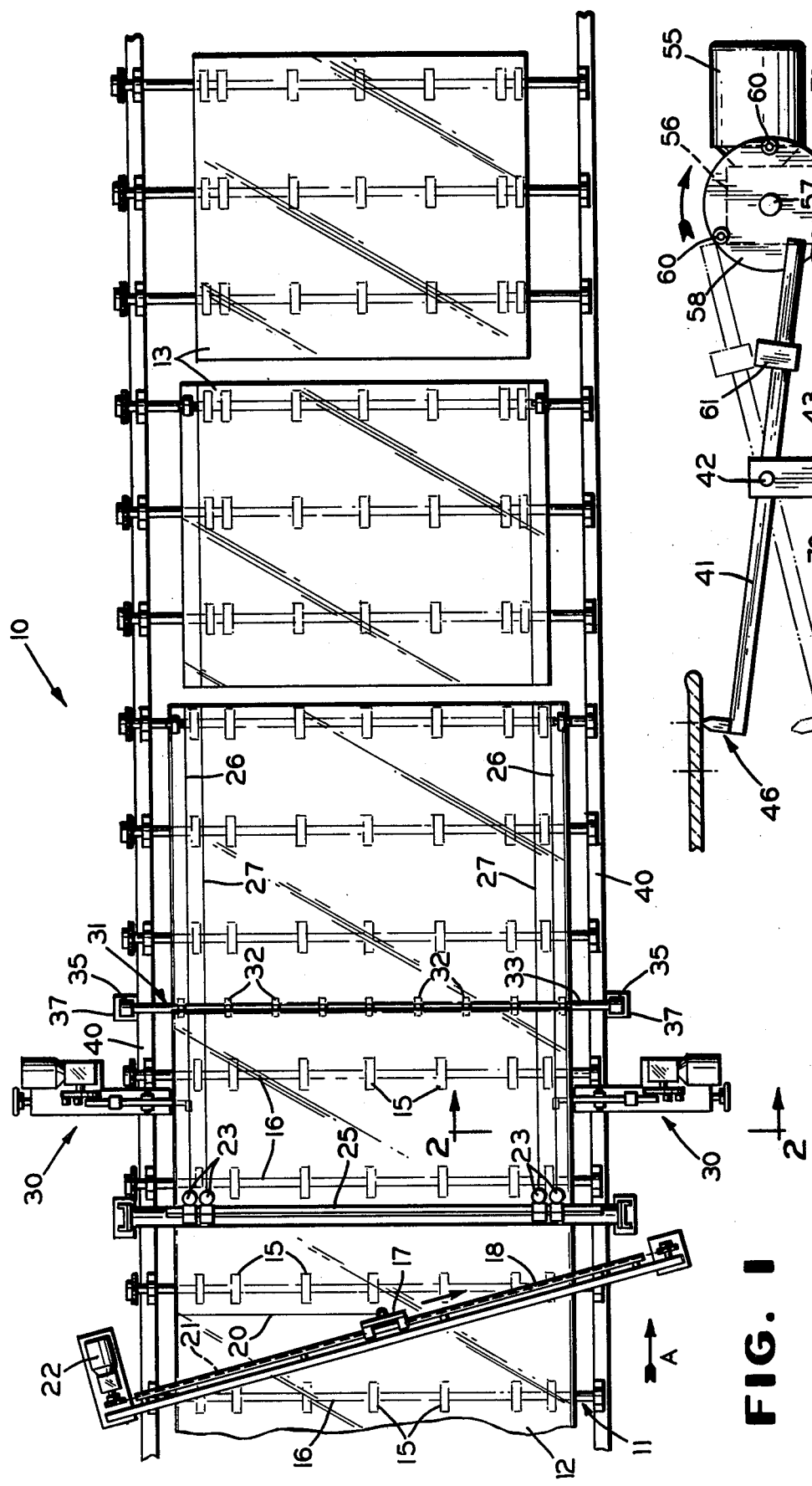
FIG. 1 is a schematic top plan view of a glass cutting production line embodying the novel features of the present invention.
FIG. 2 is a side elevational view, partly in section, showing the tapper assembly constructed in accordance with this invention.

Referring now in detail to the illustrative embodiment depicted in the accompanying drawings, there is shown schematically in FIG. 1, a continuous glass production and cutting line, comprehensively designated 10, comprising a conveyor system 11 adapted to advance a glass ribbon 12 continuously in the direction of arrow A through several successive work stations operative to ultimately sever the ribbon 12 into block-sized glass sheets 13. The conveyor system 11 comprises a series of rows of conveyor rolls 15, each row of rolls 15 being mounted in axially spaced relation on a drive shaft 16 rotated by suitable drive means (not shown) in a construction and manner well known in the art.

The continuous glass ribbon 12 is advanced on the conveyor system 11 beneath the movable transverse scoring head 17 mounted on a generally transversely extending bar 18 for movement therealong. This scoring head 17 is provided with a cutting or scoring disk for inscribing a transverse score line 20 across the width of the ribbon along the intended line of cut. A suitable drive chain arrangement 21 powered by a motor 22 is provided for moving the scoring head 17 along the bar 18.

A plurality of longitudinally oriented scoring heads 23 are mounted on a transverse support bridge or bar 25 straddling the advancing ribbon 12 and located slightly downstream of the transverse scoring head 17. The scoring heads 23 can be adjustably positioned along the bridge 25 and then fixedly secured thereto in the selected adjusted position. In the specific embodiment illustrated, two scoring heads 23 are located in relatively close proximity to each other along each longitudinal edge of the ribbon 12. These heads 23 inscribe longitudinally extending score lines 26 and 27 on the upper surface of the ribbon 12 adjacent each longitudinal edge of the ribbon 12 and along the intended lines of the first trim cut and final trim cut, respectively. The widths of these trim cuts can vary as dictated by the sizes of the sheets desired and the physical and chemical properties of the formed ribbon which affect the stress pattern therein. A pair of tapper assemblies, generally designated 30 and hereinafter more fully described, are located on opposite sides of the advancing ribbon 12 and downstream of the scoring heads 23 between the latter and a glass breaker assembly 31.

The breaker assembly 31 includes a plurality of axially spaced rolls 32 rotatably mounted on a common fixed shaft 33 supported at its opposite ends in lugs 35 (FIG. 3) connected to the distal ends of piston rods 36 of actuating cylinders 37. The cylinders 37 are supported on base members 38 projecting laterally outwardly from and welded or otherwise fixedly secured to rails 40 extending longitudinally along both opposite sides of the conveyor system. At the appropriate time, cylinders 37 are actuated to extend their respective piston rods 36 and raise the rolls 32 into engagement with the underside of the ribbon 12 along the score line 20 to apply a bending moment thereabout and break off a glass sheet 13 from the continuous ribbon 12. Certain successive rows of rolls 15 immediately downstream of the breaker assembly 31 are speeded up upon severance of the glass sheet to longitudinally separate the same from the severed leading edge of the ribbon 12.

It should be appreciated that when forming a glass ribbon by the so-called "float process" the longitudinal edges of the ribbon assume a rounded, bulbous shape known as "bulb edges", which must be trimmed from the body of the ribbon for commercial uses. Such bulb edges are trimmed by cutting along longitudinal score lines inwardly of and parallel to the edges, the elongated, narrow portion to be removed along each side commonly referred to as a "selvedge" portion. As earlier noted, in trimming the selvedge from a ribbon or body of glass, especially relatively thick glass of ½ inch thicknesses or more, it is customary to make a first trim cut inwardly of the bulb edge to relieve the high compressive stresses residing in the area adjacent such edge and then a second, final cut further inwardly of the first cut wherein the stress pattern is more uniform and balanced. When the first score is opened along the high compressive stress zone by conventional automatic breaking means, the selvedge portion distorts considerably causing the line of cut sometimes to deviate erratically from its intended line of cut. Moreover, the fragmentation of the glass caused by this severe stress imbalance can be hazardous to nearby personnel.

The present invention addresses this problem and provides a solution therefor by providing the aforementioned tapper assembly along each side of the advancing ribbon to assist in partially fracturing or breaking the glass along the first score line while preventing uncontrolled deviation of the cut as well as hazardous glass explosion or fragmentation. As best shown in FIGS. 2 and 3, each tapper assembly 30 comprises an elongated lever or rod 41 pivotally mounted, as by pin 42, between the two legs of a U-shaped bracket 43 rigidly secured to an elongated base support plate 45. The rod 41 extends in a direction generally normal to the path of movement of ribbon 12 with an end portion thereof disposed beneath the ribbon 12. This end portion of rod 41 is formed with an impact or tapping head 46 adapted to engage the glass ribbon on the surface opposite the surface on which the score line is inscribed and in vertical alignment therewith.

As shown in FIGS. 4 and 5, the tapping head 46 is formed of a generally rectangularly shaped body 47 having a head portion 48 formed with two inclined surfaces 50 and 52 extending upwardly at an angle from the upper end of the body 47 in a converging relation and terminating in a relatively narrow, flat, planar glass engaging surface 53 extending substantially the length of the head portion 48. Thus the force of the impact of tapping head 46 is concentrated in the relatively small rectangular area defined by the glass engaging surface 53.

The means for actuating the tapping head 46 includes an electric motor 55 connected to a suitable source of electric power (not shown) and physically connected to a suitable gear reduction mechanism 56 mounted on the support plate 45. The motor 55 rotates, via gear reduction mechanism 56, an output shaft 57 having a circular disk 58 rigidly secured thereon. Three cam rollers 60 are mounted at equally spaced circumferential distances on the outer face of the disk 58 adjacent the periphery thereof for engaging and raising the rear or other end of rod 41. Thus, rotation of the disk in a clockwise direction as viewed in FIG. 2 brings one of the rollers into engagement with the rear end of rod 41 for raising the same and causing the rod 41 to pivot about its axis, as defined by pin 42, thereby lowering the tapping head 46 mounted on the forward end of rod 41. A counterweight 61 is carried on the arm 41 between the pivot axis and the rear end thereof for normally biasing the tapping head 46 in its upper position. Consequently, as the rear end of rod 41 rides off the orbiting roller 60, the rod 41 under the influence of counterweight 61 will swing about its axis bringing the glass engaging surface 53 upwardly into contact with the underside of the glass ribbon 12 beneath the score line. The force of the impact of head 46 against the ribbon can be adjusted by shifting the counterweight 61 axially along the rod 41 to any desired or required position.

Applying this tapping force to the underside of the ribbon at spaced intervals therealong in vertical alignment with the score line creates spaced fissures or breaks in the glass along such score line. Then, when a bending moment is subsequently applied to the glass along the score line, the score line will open completely and continuously in a running cut that follows a true straight path along the score line.

Means are provided for adjusting the tapper assembly 30 transversely of the ribbon in order to precisely locate the glass engaging surface 53 of the tapping head 46 in alignment with the score line 26. Such means include a pair of axially spaced and aligned nuts 67 depending downwardly from the support plate 45 for threadably receiving an adjusting screw 68. The screw 68 is journalled for rotation and fixed against axial movement in axially spaced bearing blocks 70 mounted on a structural cross member 71 extending transversely of and rigidly secured to the rails 40. The screw 68 is provided at its outer end with a hand wheel 72 for facilitating turning of the screw 68. Since the screw 68 is fixed against axial movement, rotation of the screw effects longitudinal movement of the support plate 45 and thereby the tapper assembly 30 to selectively position the glass engaging surface 53 of head 46 relative to the score line, as desired.

A pressure member, generally designated 75, is mounted by means of a clamping assembly 76 on the horizontal bridge member 77 of a frame structure 78 located downstream of the tappers 30. The pressure member 75 functions to apply a bending moment to the selvedge portion of the ribbon about the score line 26 to effect breaking off the selvedge portion in a running cut along the score line 26. The pressure member 75 comprises an elongated, upright housing 80 for telescopically receiving the shank 81 of a yoke member 82. The yoke member 82 supports a pressure applying roller 83 bearing against the selvedge portion of the ribbon 12 adjacent the score line 26 to apply pressure thereto against the reaction provided by the outermost conveyor roll 32 in rolling contact with the underside of the ribbon adjacent the opposite side of score line 26. As a result, the glass is subjected to a bending moment about the score line 26 to effect a complete break in the form of a running cut along the entire score line 26.

An adjusting device in the form of a screw 85 threaded through a fixed nut 86 on the top of housing 80 is provided for axially moving the shank 81 vertically upwardly or downwardly relative to the housing 80. The lower bearing surface of the pressure applying roll 83 preferably is disposed slightly below the upper surface of the ribbon 12 to apply the necessary pressure in effecting the break. A set screw 87 threaded through a nut 88 rigidly secured on one side of the housing 80 fixes the shank 81 and thereby roller 83 in its selected vertical position.

In operation, a continuous glass ribbon 12 is advanced from a glass forming and treating source on conveyor rolls 15 in the direction of arrow A through several successive work stations. A transverse score line 20 is periodically inscribed on the upper surface of the ribbon 12 by the transverse scoring head 17 as the ribbon advances therebeneath. Also, longitudinally extending score lines 26 and 27 are inscribed on the advancing ribbon in laterally spaced relation to each other and the opposite longitudinal edges of the ribbon by means of the several scoring heads 23. The tapper assemblies 30 are continuously operative downstream of the scoring heads 23 to engage the glass ribbon with a predetermined force at the score line 26 at spaced longitudinal intervals therealong to partially shear the glass and create longitudinally spaced fissures or fractures along the score line 26. Sufficient portions of the glass between these fissures remain intact to prevent separation of the selvedge portion from the body of the ribbon at this time.

Actuation of the breaker assembly 31 is timed to occur when the transverse score line 20 passes thereover to effect snapping or breaking of the glass therealong to form a severed sheet 13 of predetermined size. A portion of the conveyor system 11 is then speeded up to move the severed sheet at a faster rate than the rate of speed of the ribbon to space or separate the severed sheet therefrom. As the severed sheet 13 advances along the conveyor, the pressure member 75 operates to apply a bending moment to the selvedge portion, snapping the glass completely through the thickness thereof and forming a running cut progressively removing the selvedge portion from the body of the ribbon 12.

The second or final trim cut along score lines 27 can be effected by pressure members 75 located adjacent the score lines 27 and which can be constructed and operative in the same manner as the pressure member 75 previously described. Since the high compressive stresses have been substantially relieved by the first trim cut along score line 26, the glass will fracture cleanly along score line 27 leaving substantially smooth and even cut edges which are generally perpendicular to the major surfaces of the glass body.

While the tapper assemblies 30 shown in the illustrative embodiment of FIG. 1 are located between the longitudinally oriented scoring heads 23 and the breaker assembly 31, it should be understood that the tapper assemblies 30 can be located downstream of the breaker assembly 31 so as to be operative on the severed sheet panels rather than the ribbon 12. Also, while the glass engaging surface 53 of the tapping head 46 is substantially flat and extends lengthwise of the head portion 48, it can have various outline configurations and sizes as well as a curved glass engaging surface within the purview of this invention.

From the foregoing, it is apparent that the objects of this invention have been fully accomplished. As a result of this invention, a new and useful apparatus is provided for facilitating the removal of selvedge portions from a body of glass by initiating fissures or cracks in the glass along the score line prior to breaking the glass therealong by conventional breaking apparatus. The weakened zone along the score line occasioned by this partial cracking facilitates subsequent severance of the glass along the score line in a true linear path therealong. The pre-weakening of the glass by the tapper arrangement of this invention greatly reduces the possibility of the running cut deviating from its intended path and dramatically reduces glass explosion or fragmentation in this high compressive stress area.

It is to be understood that the form of the invention herewith shown and described is to be taken as an illustrative embodiment only of the same, and that various changes in the shape, size and arrangement of parts, as well as various procedure changes, may be resorted to without departing from the spirit of the invention.

We claim:

1. Apparatus for facilitating the removal of marginal edges from relatively thick glass bodies comprising: means for advancing a thick body of glass in a generally horizontal path; means along said path for scoring one surface of said glass body along at least one longitudinal line spaced inwardly from one of the longitudinal edges of said body; means downstream of said scoring means for partially fracturing the glass body along said score comprising a tapper assembly including a support plate, an elongated rod pivotally mounted about a horizontal axis on said plate, and an impact head rigidly secured at one end of said rod and intermittently engageable under the influence of force with the glass body surface opposite said score in general vertical registry therewith; and means downstream of said fracturing means for severing said glass body along said score line as said body of glass advances in said horizontal path.

2. Apparatus according to claim 1, including means for periodically actuating the other end of said rod for pivoting said rod to bring said impact head into engagement with said opposite glass body surface.

3. Apparatus according to claim 1, including means on said rod for adjusting the force delivered by said impact head.

4. Apparatus according to claim 3, wherein said adjusting means comprises a counterweight slidably mounted on said rod for sliding movement thereon between said pivot axis and the other end of said rod.

5. Apparatus according to claims 1, 2, 3 or 4, wherein said impact head is formed with a glass engaging surface of reduced area to concentrate the impact forces applied by said head.

* * * * *